United States Patent
Chan

(10) Patent No.: US 8,508,704 B2
(45) Date of Patent: Aug. 13, 2013

(54) PIXEL ARRAY

(75) Inventor: Te-Wei Chan, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 643 days.

(21) Appl. No.: 12/729,242

(22) Filed: Mar. 23, 2010

(65) Prior Publication Data

US 2011/0157121 A1 Jun. 30, 2011

(30) Foreign Application Priority Data

Dec. 31, 2009 (TW) ................................ 98146196 A

(51) Int. Cl.
*G02F 1/1343* (2006.01)
(52) U.S. Cl.
USPC ............. 349/139; 349/48; 349/129; 349/144; 349/93; 345/211; 345/55; 345/87
(58) Field of Classification Search
USPC ..... 349/129, 93, 139, 48, 123, 144; 345/211, 345/55, 87
See application file for complete search history.

(56) References Cited

U.S. PATENT DOCUMENTS

| | | | |
|---|---|---|---|
| 2008/0024689 A1* | 1/2008 | Ahn ................................. | 349/43 |
| 2008/0036931 A1* | 2/2008 | Chan et al. ....................... | 349/38 |
| 2008/0143912 A1 | 6/2008 | Kim | |
| 2008/0291347 A1* | 11/2008 | Kim et al. ........................ | 349/33 |
| 2008/0303768 A1* | 12/2008 | Do et al. .......................... | 345/90 |
| 2009/0009449 A1* | 1/2009 | Uchida et al. ................... | 345/87 |
| 2009/0027581 A1* | 1/2009 | You et al. ......................... | 349/48 |
| 2009/0185091 A1* | 7/2009 | Kim et al. ........................ | 349/39 |
| 2010/0201903 A1* | 8/2010 | Huang et al. .................... | 349/55 |
| 2010/0253869 A1* | 10/2010 | Ting et al. ....................... | 349/48 |
| 2011/0095969 A1* | 4/2011 | Ueda ............................... | 345/87 |
| 2012/0105756 A1 | 5/2012 | Chan et al. | |

FOREIGN PATENT DOCUMENTS

TW 200809350 2/2008

OTHER PUBLICATIONS

Office Action of Taiwan Counterpart Application, issued on Dec. 26, 2012, p. 1-p. 11, in which the listed reference TW200809350 was cited.

* cited by examiner

*Primary Examiner* — Edward Glick
*Assistant Examiner* — Sang V Nguyen
(74) *Attorney, Agent, or Firm* — Jianq Chyun IP Office

(57) ABSTRACT

A pixel array including a plurality of scan lines, a plurality of data lines, and a plurality of sub-pixels is provided. Each sub-pixel is electrically connected to one of the scan lines and one of the data lines correspondingly. Each sub-pixel arranged in the $n^{th}$ row includes a first switch, a second switch, a first pixel electrode, a second pixel electrode and a third switch. The first switch and the second switch are electrically connected to the $n^{th}$ scan line and the $m^{th}$ data line. The first pixel electrode is electrically connected to the first switch. The second pixel electrode is electrically connected to the second switch and has an opening for accommodating the first pixel electrode. In each sub-pixel, the first pixel electrode is surrounded by the second pixel electrode. In addition, the third switch is electrically connected to the $(n+1)^{th}$ scan line and the second pixel electrode.

32 Claims, 11 Drawing Sheets

PIXEL ARRAY

CROSS-REFERENCE TO RELATED APPLICATION

This application claims the priority benefit of Taiwan application serial no. 98146196, filed on Dec. 31, 2009. The entirety of the above-mentioned patent application is hereby incorporated by reference herein and made a part of specification.

BACKGROUND OF THE INVENTION

1. Field of Invention

The present invention relates to a pixel array, and more generally to a pixel array with good display quality.

2. Description of Related Art

With the continuous advancement of larger-sized LCDs, the demand for progress and breakthroughs in wide viewing angle technology are growing to resolve the viewing angle problem resulted from larger display size. A multi-domain vertical alignment (MVA) LCD panel is one of the common LCDs utilizing the wide viewing angle technology. To improve the color washout phenomenon in the LCD, an advanced-MVA LCD has been developed. The advanced-MVA LCD mainly divides each sub-pixel into a main display region and a sub-display region. The main display region and the sub-display region in the same sub-pixel are respectively applied with different voltages through the adequate circuit design and the driving method, so as to improve the color washout phenomenon.

Besides, in two adjacent sub-pixels, the crosstalk phenomenon between the pixel electrodes deteriorates the display quality of the sub-pixels. Accordingly, it is necessary to further enhance the display quality of the sub-pixels.

SUMMARY OF THE INVENTION

The present invention provides a pixel array with good display quality.

The present invention provides a pixel array including a plurality of scan lines, a plurality of data lines and a plurality of sub-pixels. The data lines are intersected with the scan lines to define a plurality of sub-pixel regions. The sub-pixels are disposed in the sub-pixel regions. Each sub-pixel is electrically connected to one of the scan lines and one of the data lines correspondingly, and each sub-pixel arranged in the $n^{th}$ row includes a first switch, a second switch, a first pixel electrode, a second pixel electrode and a third switch. The first switch and the second switch are electrically connected the $n^{th}$ scan line and the $m^{th}$ data line, and the first switch has a signal output terminal. The first pixel electrode is electrically connected to the first switch. The second pixel electrode is electrically connected the second switch and has an opening for accommodating the first pixel electrode. The first pixel electrode is surrounded by the second pixel electrode in each sub-pixel. The third switch is electrically connected to the $(n+1)^{th}$ scan line and the second pixel electrode and has a floating terminal.

According to an embodiment of the present invention, each first switch arranged in the $n^{th}$ row is a first thin film transistor having a first gate electrically connected to the $n^{th}$ scan line, a first source electrically connected to one of the data lines, and the signal output terminal (i.e. first drain) electrically to the first pixel electrode.

According to an embodiment of the present invention, each second switch arranged in the $n^{th}$ row is a second thin film transistor having a second gate electrically connected to the $n^{th}$ scan line, a second source electrically connected to one of the data lines, and a second drain.

According to an embodiment of the present invention, each third switch arranged in the $n^{th}$ row is a third thin film transistor having a third gate electrically connected to the $(n+1)^{th}$ scan line, a third source electrically connected to the second pixel electrode, and the floating terminal (i.e. the third drain).

According to an embodiment of the present invention, each second pixel electrode includes a first sub-electrode portion, a second sub-electrode portion and at least one connection line. The connection line is connected to the first sub-electrode portion and the second sub-electrode portion. In each sub-pixel, the first pixel electrode is disposed between the first sub-electrode portion and the second sub-electrode portion, and the first pixel electrode is surrounded by the first sub-electrode portion, the second sub-electrode portion and the connection line.

According to an embodiment of the present invention, the floating terminal extends from the $(n+1)^{th}$ scan line to under the second sub-electrode portion and the first pixel electrode correspondingly.

According to an embodiment of the present invention, the pixel array further includes a plurality of first common lines and a plurality of second common lines. The first common lines are disposed under the first sub-electrode portions and the first pixel electrodes, and the second common lines are disposed under the second sub-electrode portions.

According to an embodiment of the present invention, a portion of the signal output terminal is disposed above one of the first common lines correspondingly.

According to an embodiment of the present invention, at least a portion of the second common lines are disposed under the floating terminals.

According to an embodiment of the present invention, each first sub-electrode portion has at least one first aperture disposed above the signal output terminal.

According to an embodiment of the present invention, each second sub-electrode portion has at least one second aperture disposed above the floating terminal.

The present invention further provides a pixel array including a plurality of scan lines, a plurality of data line and a common line. The data lines are intersected with the scan lines to define a plurality of sub-pixel regions. The sub-pixels are disposed in the sub-pixel regions. Each sub-pixel is electrically connected to one of the scan lines and one of the data lines correspondingly, each sub-pixel arranged in the $n^{th}$ row includes a main display region and a sub-display region, and the main display region is surrounded by the sub-display region. The common line is disposed under the sub-display regions and surrounding the main display regions.

According to an embodiment of the present invention, each sub-pixel arranged in the $n^{th}$ row includes a first switch, a second switch, a first pixel electrode, a second pixel electrode and a third switch. The first switch and the second switch are electrically connected the $n^{th}$ scan line and the $m^{th}$ data line, and the first switch has a signal output terminal. The first pixel electrode is disposed in the main display region and electrically connected to the signal output terminal of the first switch. The second pixel electrode is disposed in the sub-display region and electrically connected the second switch, wherein the first pixel electrode is surrounded by the second pixel electrode in each sub-pixel. The third switch is electrically connected to the $(n+1)^{th}$ scan line and the second pixel electrode and has a floating terminal.

According to an embodiment of the present invention, each first switch arranged in the $n^{th}$ row is a first thin film transistor having a first gate electrically connected to the $n^{th}$ scan line, a first source electrically connected to one of the data lines, and the signal output terminal (i.e. first drain) electrically to the first pixel electrode.

According to an embodiment of the present invention, each second switch arranged in the $n^{th}$ row is a second thin film transistor having a second gate electrically connected to the $n^{th}$ scan line, a second source electrically connected to one of the data lines, and a second drain.

According to an embodiment of the present invention, each third switch arranged in the $n^{th}$ row is a third thin film transistor having a third gate electrically connected to the $(n+1)^{th}$ scan line, a third source electrically connected to the second pixel electrode, and the floating terminal (i.e. third drain).

According to an embodiment of the present invention, each second pixel electrode includes a first sub-electrode portion, a second sub-electrode portion and at least one connection line. The connection line is connected to the first sub-electrode portion and the second sub-electrode portion. In each sub-pixel, the first pixel electrode is disposed between the first sub-electrode portion and the second sub-electrode portion, and the first pixel electrode is surrounded by the first sub-electrode portion, the second sub-electrode portion and the connection line.

According to an embodiment of the present invention, each floating terminal extends from the $(n+1)^{th}$ scan line to under the second sub-electrode portion and the first pixel electrode correspondingly.

According to an embodiment of the present invention, the common line includes a plurality of ring patterns, a plurality of first cross patterns and a plurality of second cross patterns. The ring patterns respectively surround the main display regions. The first cross patterns are respectively connected to the ring patterns, wherein each first cross pattern is disposed under one of the first sub-electrode portions correspondingly. The second cross patterns are respectively connected to the ring patterns, wherein each second cross pattern is disposed under one of the second sub-electrode portions correspondingly.

According to an embodiment of the present invention, the ring patterns are connected to each other through a plurality of connection patterns.

According to an embodiment of the present invention, the first cross patterns and the second cross patterns are connected to each other through a plurality of connection patterns.

According to an embodiment of the present invention, a portion of each signal output terminal is disposed above one of the first cross patterns correspondingly.

According to an embodiment of the present invention, the second cross patterns are respectively disposed under the floating terminals.

According to an embodiment of the present invention, each first sub-electrode portion has at least one first aperture disposed above the signal output terminal.

According to an embodiment of the present invention, each second sub-electrode portion has at least one second aperture disposed above the floating terminal.

According to an embodiment of the present invention, each sub-pixel arranged in the $n^{th}$ row includes a first switch, a second switch, a first pixel electrode and a second pixel electrode. The first switch and the second switch are electrically connected the $n^{th}$ scan line while electrically connected to different data lines, and the second switch has a signal output terminal. The first pixel electrode is disposed in the main display region and electrically connected to the first switch. The second pixel electrode is disposed in the sub-display region and electrically connected the signal output terminal of the second switch, wherein the first pixel electrode is surrounded by the second pixel electrode in each sub-pixel.

According to an embodiment of the present invention, each second pixel electrode includes a first sub-electrode portion, a second sub-electrode portion and at least one connection line. The connection line is connected to the first sub-electrode portion and the second sub-electrode portion. In each sub-pixel, the first pixel electrode is disposed between the first sub-electrode portion and the second sub-electrode portion, and the first pixel electrode is surrounded by the first sub-electrode portion, the second sub-electrode portion and the connection line.

According to an embodiment of the present invention, the common line includes a plurality of ring patterns, a plurality of first cross patterns and a plurality of second cross patterns. The ring patterns respectively surround the main display regions. The first cross patterns are respectively connected to the ring patterns, wherein each first cross pattern is disposed under one of the first sub-electrode portions correspondingly. The second cross patterns are respectively connected to the ring patterns, wherein each second cross pattern is disposed under one of the second sub-electrode portions correspondingly.

According to an embodiment of the present invention, the ring patterns are connected to each other through a plurality of connection patterns.

According to an embodiment of the present invention, the first cross patterns and the second cross patterns are connected to each other through a plurality of connection patterns.

According to an embodiment of the present invention, a portion of each signal output terminal is disposed above one of the first cross patterns correspondingly.

According to an embodiment of the present invention, each first sub-electrode portion has at least one first aperture disposed above the signal output terminal.

In view of the above, according to an embodiment of the present invention, the first pixel electrode is surrounded by the second pixel electrode in each sub-pixel, so that the crosstalk phenomenon between the two adjacent first pixel electrodes can be improved. Further, according to another embodiment of the present invention, the common line is disposed under the sub-display regions and surrounds the main display regions, so that the aperture ratio of sub-pixels in the pixel array can be enhanced.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
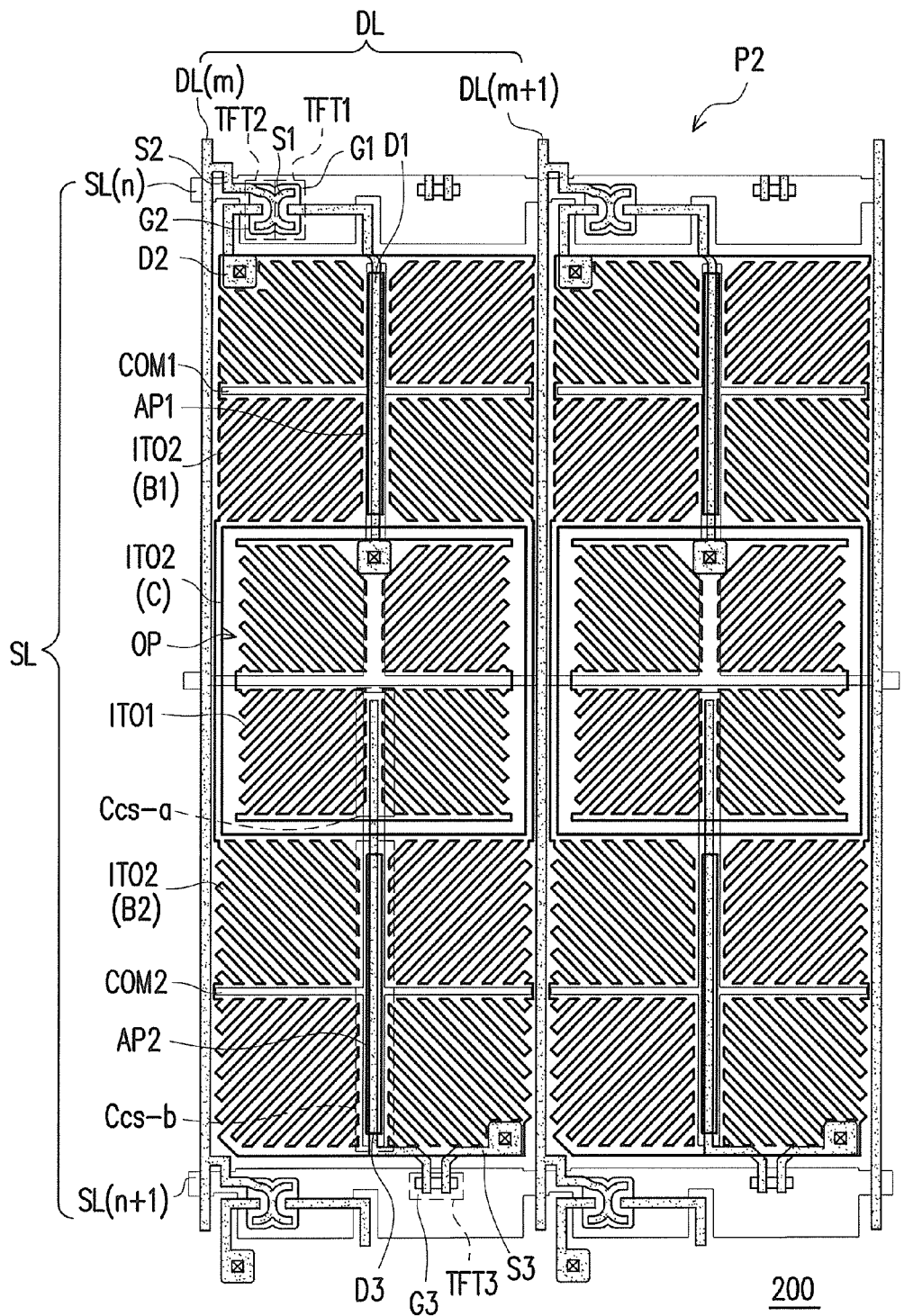
FIG. 1 schematically illustrates a pixel array according to the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

First Embodiment

FIG. 1 schematically illustrates a pixel array according to the first embodiment of the present invention. Referring to FIG. 1, a pixel array 200 of this embodiment includes a plurality of scan lines SL (only scan lines SL(n) and SL(n+1) are schematically illustrated in FIG. 1), a plurality of data lines DL (only data lines DL(m) and DL(m+1) are schematically illustrated in FIG. 1) and a plurality of sub-pixels P2. The data lines DL and the scan lines SL are intersected to define a plurality of sub-pixel regions, and each sub-pixel P2 is disposed in the corresponding sub-pixel region. It is noted that only a portion of the sub-pixels P2 are schematically illustrated in FIG. 1, but the present invention is not limited thereto. The number of the sub-pixels P2 arranged in an array can be appropriately adjusted depending on the required image resolution.

Each sub-pixel P2 is electrically connected to one of the scan lines SL and one of the data lines DL correspondingly. In this embodiment, the sub-pixels P2 are arranged in a plurality of rows, and the sub-pixels P2 arranged in the $n^{th}$ row are electrically connected to the $n^{th}$ scan line SL(n) and the $(n+1)^{th}$ scan line SL(n+1). In details, each sub-pixel P2 arranged in the $n^{th}$ row includes a first switch TFT1, a second switch TFT2, a first pixel electrode ITO1, a second pixel electrode ITO2 and a third switch TFT3. The first switch TFT1 and the second switch TFT2 are electrically connected the $n^{th}$ scan line SL(n) and the $m^{th}$ data line DL(m), and the first switch TFT1 has a signal output terminal D1. The first pixel electrode ITO1 is electrically connected to the signal output terminal D1 of the first switch TFT1. The second pixel electrode ITO2 is electrically connected the second switch TFT2 and has, for example, at least one first aperture AP1 above the signal output terminal D1. Since the first aperture AP1 can effectively reduce the parasitic capacitance between the signal output terminal D1 and the second pixel electrode ITO2, the first aperture AP1 is beneficial to enhance the display quality. It is for sure that the first aperture AP1 above the signal output terminal D1 is an optional design. The present invention is not limited by the embodiment in which the second pixel electrode ITO2 is required to have the first aperture AP1.

In this embodiment, the first switch TFT1 and the second switch TFT2 of each sub-pixel P2 arranged in the $n^{th}$ row are disposed between the $n^{th}$ scan line SL(n) and the $(n+1)^{th}$ scan line SL(n+1). Further, the third switch TFT3 is electrically connected to the $(n+1)^{th}$ scan line SL(n+1) and the second pixel electrode ITO2 and has a floating terminal D3. The second pixel electrode ITO2 has at least one second aperture AP2 above the floating terminal D3. Since the second aperture AP2 can effectively reduce the parasitic capacitance between the floating terminal D3 and the second pixel electrode ITO2, the second aperture AP2 is beneficial to enhance the display quality. It is for sure that the second aperture AP2 above the floating terminal D3 is an optional design. The present invention is not limited by the embodiment in which the second pixel electrode ITO2 is required to have the second aperture AP2.

As shown in FIG. 1, each first switch TFT1 arranged in the $n^{th}$ row is a first thin film transistor having a first gate G1, a first source S1 and the signal output terminal D1 (i.e. first drain). The first gate G1 is electrically connected to the $n^{th}$ scan line SL(n), the first source S1 is electrically connected to one of the data lines DL, and the signal output terminal D1 is electrically connected to the first pixel electrode ITO1. Further, each second switch TFT2 arranged in the $n^{th}$ row is a second thin film transistor having a second gate G2, a second source S2 and a second drain D2. The second gate G2 is electrically connected to the $n^{th}$ scan line SL(n), and the second source S2 is electrically connected to one of the data lines DL. Each third switch TFT3 arranged in the $n^{th}$ row is a third thin film transistor having a third gate G3, a third source S3 and the floating terminal D3 (i.e. third drain). The third gate G3 is electrically connected to the $(n+1)^{th}$ scan line SL(n+1), and the third source S3 is electrically connected to the second pixel electrode ITO2.

It is noted that the second pixel electrode ITO2 of this embodiment has a first opening OP for accommodating the first pixel electrode ITO2, and the first pixel electrode ITO1 is surrounded by the second pixel electrode ITO2 in each sub-pixel P2. In details, each second pixel electrode ITO2 includes a first sub-electrode portion B1, a second sub-electrode portion B2 and at least one connection line C. Herein, the width of the connection line C is, for example, more than 2 μm. The connection line C is connected to the first sub-electrode portion B1 and the second sub-electrode portion B2. In each sub-pixel P2, the first pixel electrode ITO1 is disposed between the first sub-electrode portion B1 and the second sub-electrode portion B2, and the first pixel electrode ITO1 is surrounded by the first sub-electrode portion B1, the second sub-electrode portion B2 and the connection line C. For example, the number of the connection lines C in each sub-pixel P2 is two, and the two connection lines C are respectively disposed beside the first pixel electrode ITO1. Further, the width of the two connection lines C can be adjusted according to the actual demand.

As shown in FIG. 1, each floating terminal D3 of this embodiment extends from the $(n+1)^{th}$ scan line SL(n+1) to under the second sub-electrode portion B2 and the first pixel electrode ITO1 correspondingly. In other words, each floating terminal D3 is partially overlapped with the corresponding first pixel electrode ITO1, so that their overlapping parts are coupled to form a first capacitance Ccs-a. It is noted that the first pixel electrode ITO1 has a cross pattern and a plurality of stripe patterns extending outwardly from the cross pattern, and the stripe patterns extends in different directions. In details, the stripe patterns of the first pixel electrode ITO1 define four alignment domains. In this embodiment, since the first capacitance Ccs-a is disposed under the cross pattern of the first pixel electrode ITO1, the aperture ratio is not seriously degraded due to the deposition of the first capacitance Ccs-a.

Similarly, the second pixel electrode ITO2 also has a cross pattern and a plurality of stripe patterns extending outwardly from the cross pattern. The first sub-electrode portion B1 and the second sub-electrode portion B2 of the second pixel electrode ITO2 define eight alignment domains.

The pixel array 200 of this embodiment can further include a plurality of first common lines COM1 and a plurality of second common lines COM2. The first common lines COM1 are disposed under the first sub-electrode portions B1 and the first pixel electrodes ITO1, and the second common lines COM2 are only disposed under the second sub-electrode portions B2. In details, a portion of each signal output terminal D1 is disposed above one of the first common lines COM1 correspondingly, and at least a portion of the second common lines COM2 are disposed under the floating terminals D3. In other words, each floating terminal D3 is at least partially overlapped with the corresponding second common line COM2, so that their overlapping parts are coupled to form a second capacitance Ccs-b.

When a high voltage Vgh is applied to the scan line SL(n), the image data can be recorded into each sub-pixel P2 electrically connected to the scan line SL(n) through the data lines DL(m−1) and DL (m); and meanwhile, the first pixel electrode ITO1 and the second pixel electrode ITO2 have the same voltage. Thereafter, when a high voltage is applied to the scan line SL(n+1), the first capacitance Ccs-a and the second capacitance Ccs-b make the first pixel electrode ITO1 and the second pixel electrode ITO2 have different voltages.

In this embodiment, in each sub-pixel P2, the first pixel electrode ITO1 is coupled to the first common line COM1 to form a first storage capacitance, and the first pixel electrode ITO1 is couple to a common electrode on the opposite substrate (e.g. color filter substrate) to form a first liquid crystal capacitance. Similarly, the second pixel electrode ITO2 is coupled to the second common line COM2 to form a second storage capacitance, and the second pixel electrode ITO2 is couple to the common electrode on the opposite substrate (e.g. color filter substrate) to form a second liquid crystal capacitance.

In an embodiment of the present invention, since the first pixel electrode ITO1 is surrounded by the second pixel electrode ITO2 in each sub-pixel P2, the crosstalk phenomenon between the two adjacent first pixel electrodes ITO1 can be improved by the shielding phenomenon of the connection lines C.

Second Embodiment

Figure 2:
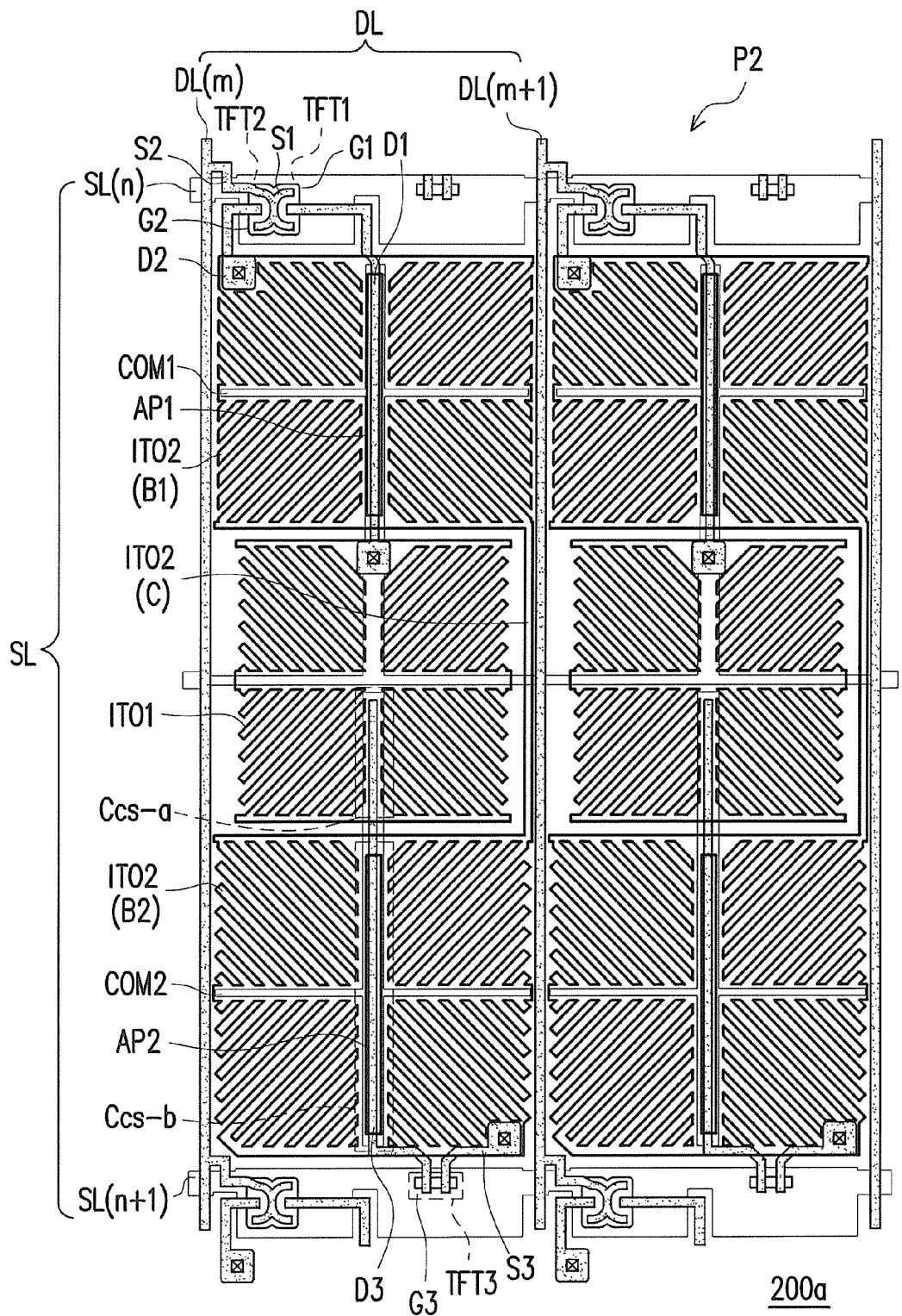
FIG. 2 schematically illustrates a pixel array according to the second embodiment of the present invention.

FIG. 2 schematically illustrates a pixel array according to the second embodiment of the present invention. Referring to FIG. 2, the pixel array 200a of this embodiment is similar to the pixel array 200 of the first embodiment, and the difference between them lies in that the number of the connection lines C. In details, the number of the connection lines C of this embodiment in each sub-pixel P2 is one, and this connection line C is only disposed at one side of the first pixel electrode ITO1, so as to reduce the crosstalk phenomenon between the two adjacent first pixel electrodes ITO1.

Third Embodiment

Figure 3:
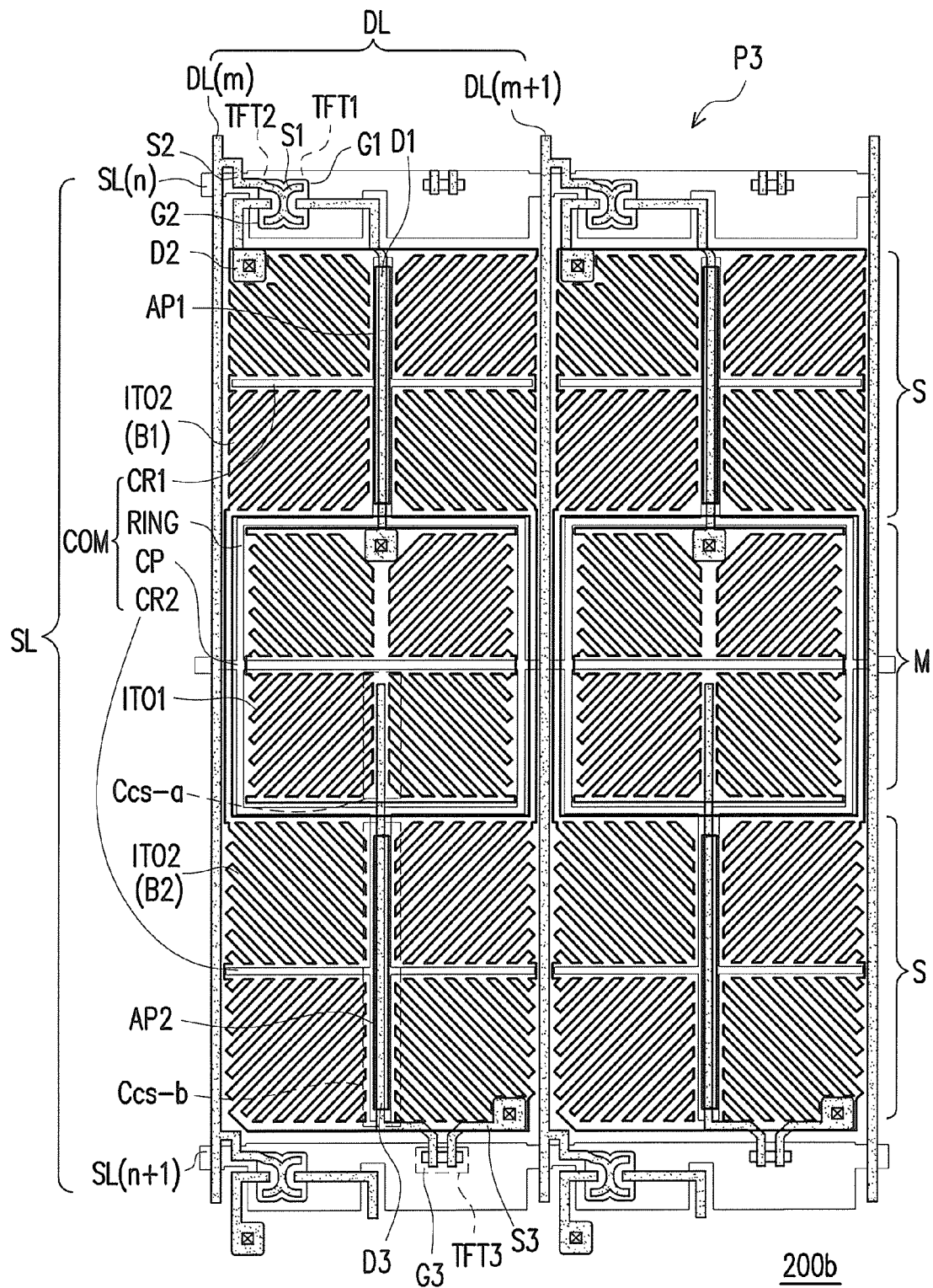
FIG. 3 schematically illustrates a pixel array according to the third embodiment of the present invention.

FIG. 3 schematically illustrates a pixel array according to the third embodiment of the present invention. Referring to FIG. 3, the pixel array 200b of this embodiment includes a plurality of scan lines SL (only scan lines SL(n) and SL(n+1) are schematically illustrated in FIG. 3), a plurality of data lines DL (only data lines DL(m) and DL(m+1) are schematically illustrated in FIG. 3), a plurality of sub-pixels P3 and a common line COM. The data lines DL and the scan lines SL are intersected to define a plurality of sub-pixel regions, and each sub-pixel P3 is disposed in the corresponding sub-pixel region. It is noted that only a portion of the sub-pixels P3 are schematically illustrated in FIG. 3, but the present invention is not limited thereto. The number of the sub-pixels P3 arranged in an array can be appropriately adjusted depending on the required image resolution.

Each sub-pixel P3 is electrically connected to one of the scan lines SL and one of the data lines DL correspondingly. Each sub-pixel P3 arranged in the $n^{th}$ row includes a main display region M and a sub-display region S, and the main display region M is surrounded by the sub-display region S. Further, the common line COM is disposed under the sub-display regions S and surrounding the main display regions M. In this embodiment, the sub-pixels P3 are arranged in a plurality of rows, and the sub-pixels P3 arranged in the $n^{th}$ row are electrically connected to the $n^{th}$ scan line SL(n) and the $(n+1)^{th}$ scan line SL(n+1). In details, each sub-pixel P3 arranged in the $n^{th}$ row includes a first switch TFT1, a second switch TFT2, a first pixel electrode ITO1, a second pixel electrode ITO2 and a third switch TFT3. The first switch TFT1 and the second switch TFT2 are electrically connected the $n^{th}$ scan line SL(n) and the $m^{th}$ data line DL(m), and the first switch TFT1 has a signal output terminal D1. The first pixel electrode ITO1 is electrically connected to the signal output terminal D1 of the first switch TFT1, and the second pixel electrode ITO2 is electrically connected the second switch TFT2. Further, the first pixel electrode ITO1 is disposed in the main display region M, and the second pixel electrode ITO2 is disposed in the sub-display region S.

The sub-pixels P3 of this embodiment are similar to the sub-pixels P2 of the first embodiment, and the details are not iterated herein.

It is noted that the common line COM of this embodiment includes a plurality of ring patterns RING, a plurality of first cross patterns CR1 and a plurality of second cross patterns CR2. The ring patterns RING respectively surround the main display regions M. The first cross patterns CR1 are respectively connect to the ring patterns RING, and each first cross pattern CR1 is disposed under one of the first sub-electrode portions B1 correspondingly. The second cross patterns CR2 are respectively connect to the ring patterns RING, and each second cross pattern CR2 is disposed under one of the second sub-electrode portions B2 correspondingly. As shown in FIG. 3, in this embodiment, the adjacent ring patterns RING are connected to each other through a plurality of connection patterns CP. In this embodiment, the connection patterns CP are connected to the ring patterns RING, and further extend to the ring patterns RING.

Figure 4A:
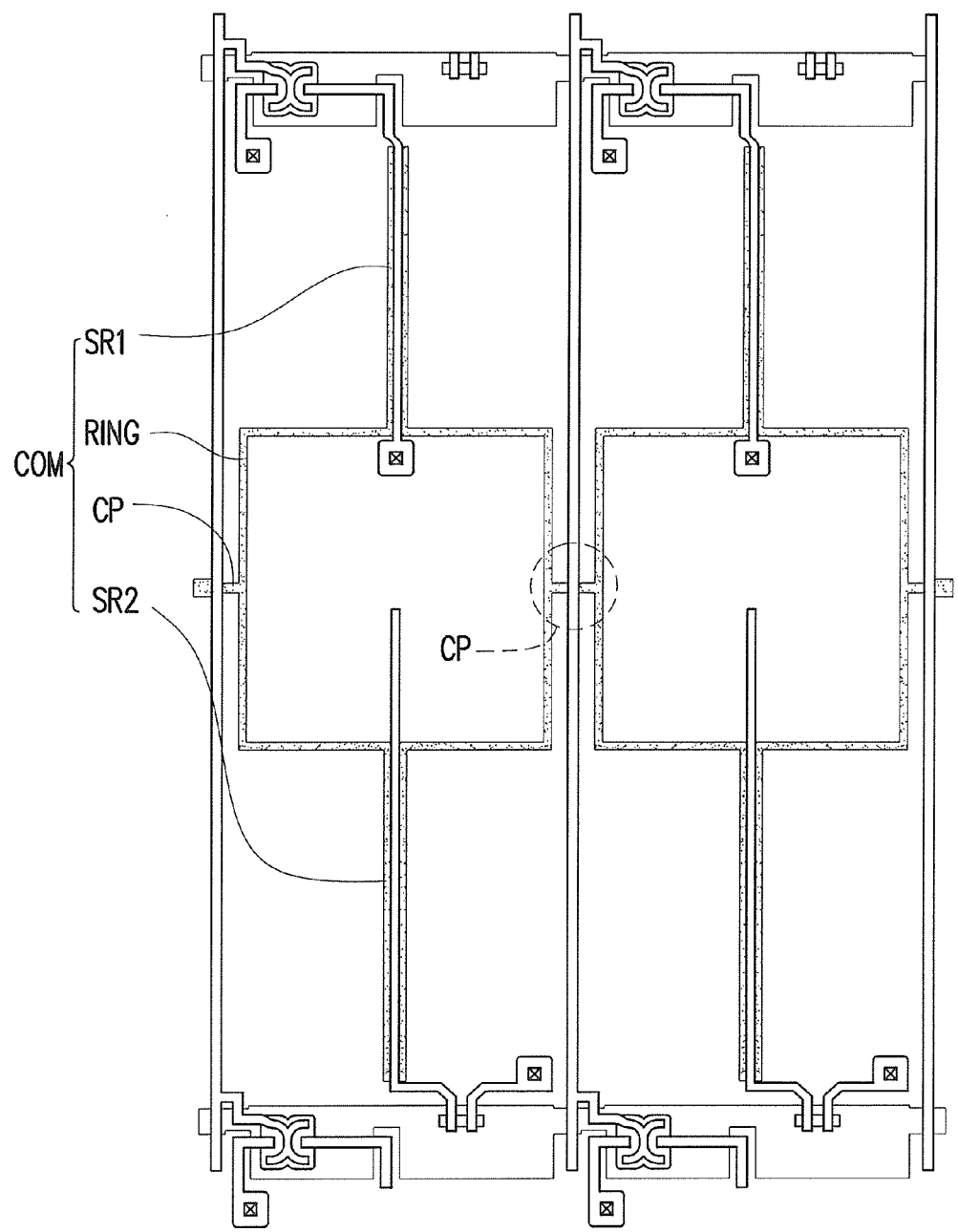
FIGS. 4A-4C schematically illustrate other designs of a common line.
Figure 4B:
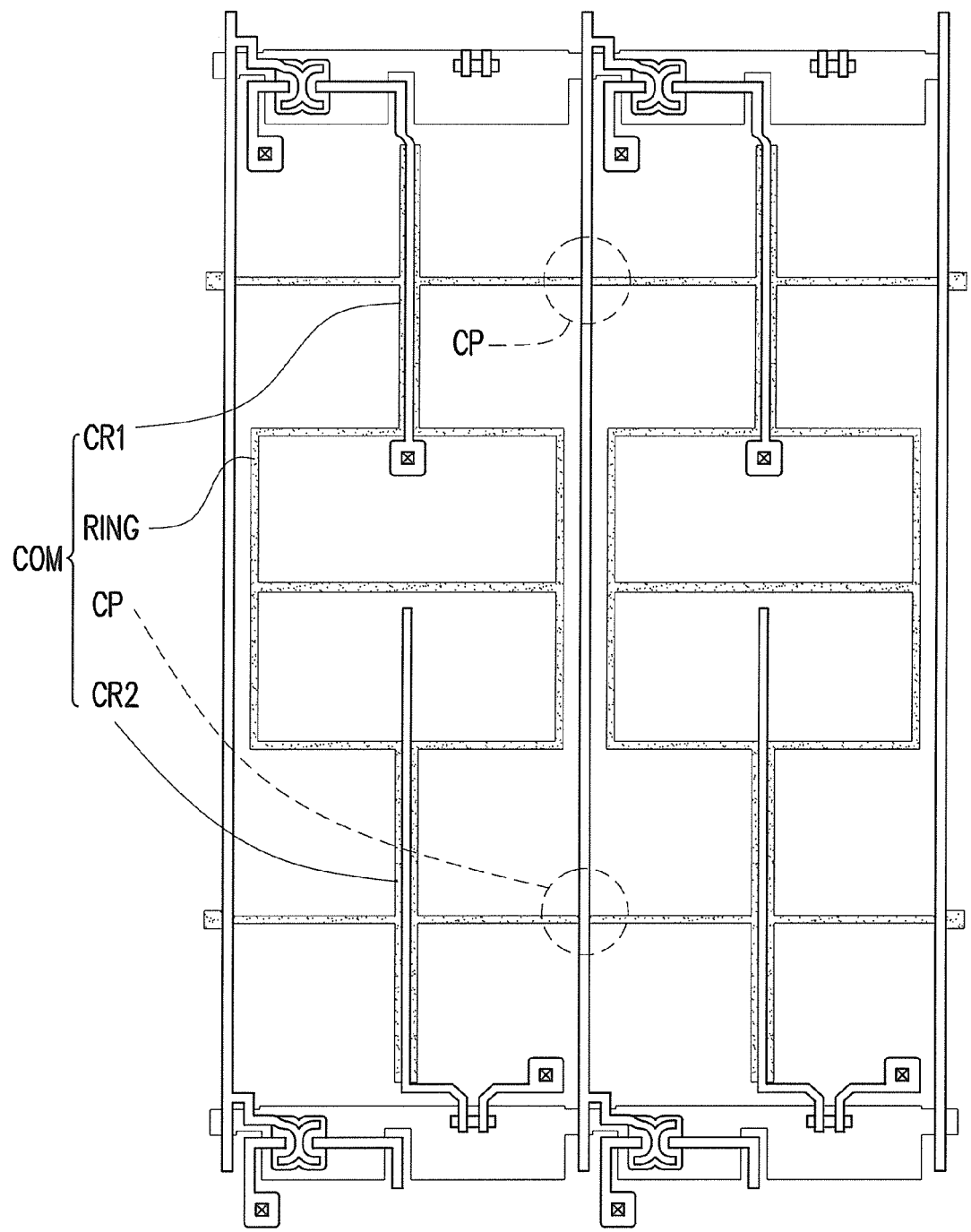
Figure 4C:
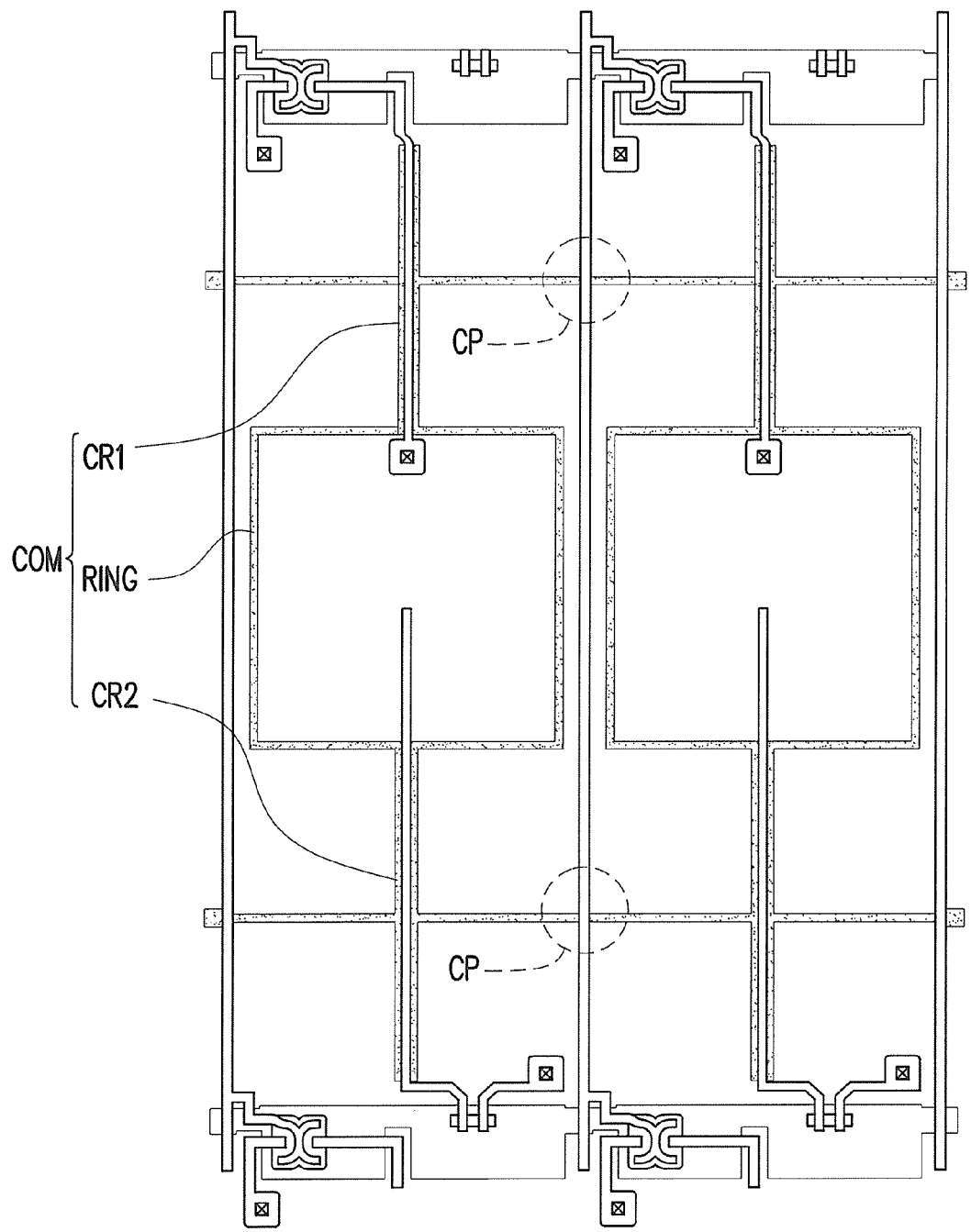

FIGS. 4A-4C schematically illustrate other designs of a common line. To clearly represent the patterns of the common line, the first pixel electrodes and the second pixel electrodes are omitted in FIGS. 4A to 4C.

The common line COM in FIG. 4A is similar to that in FIG. 3. The difference lies in that the connection patterns CP in FIG. 4A do not extend into the ring patterns RING, and first stripe patterns SR1 and second stripe patterns SR2 in FIG. 4A replace the first cross patterns CR1 and the second cross patterns CR2 in FIG. 3.

The common line COM in FIG. 4B or 4C is similar to that in FIG. 3. The difference between them lies in that in the common line COM in FIG. 4B or 4C, the first cross patterns CR1 and the second cross patterns CR2 are connected to each other through a plurality of connection patterns CP.

In this embodiment, since the common lines COM are respectively disposed under the sub-display regions S and surround the main display regions M, and aperture ratio of the sub-pixels P3 in the pixel array 200b can be further enhanced.

Fourth Embodiment

Figure 5:
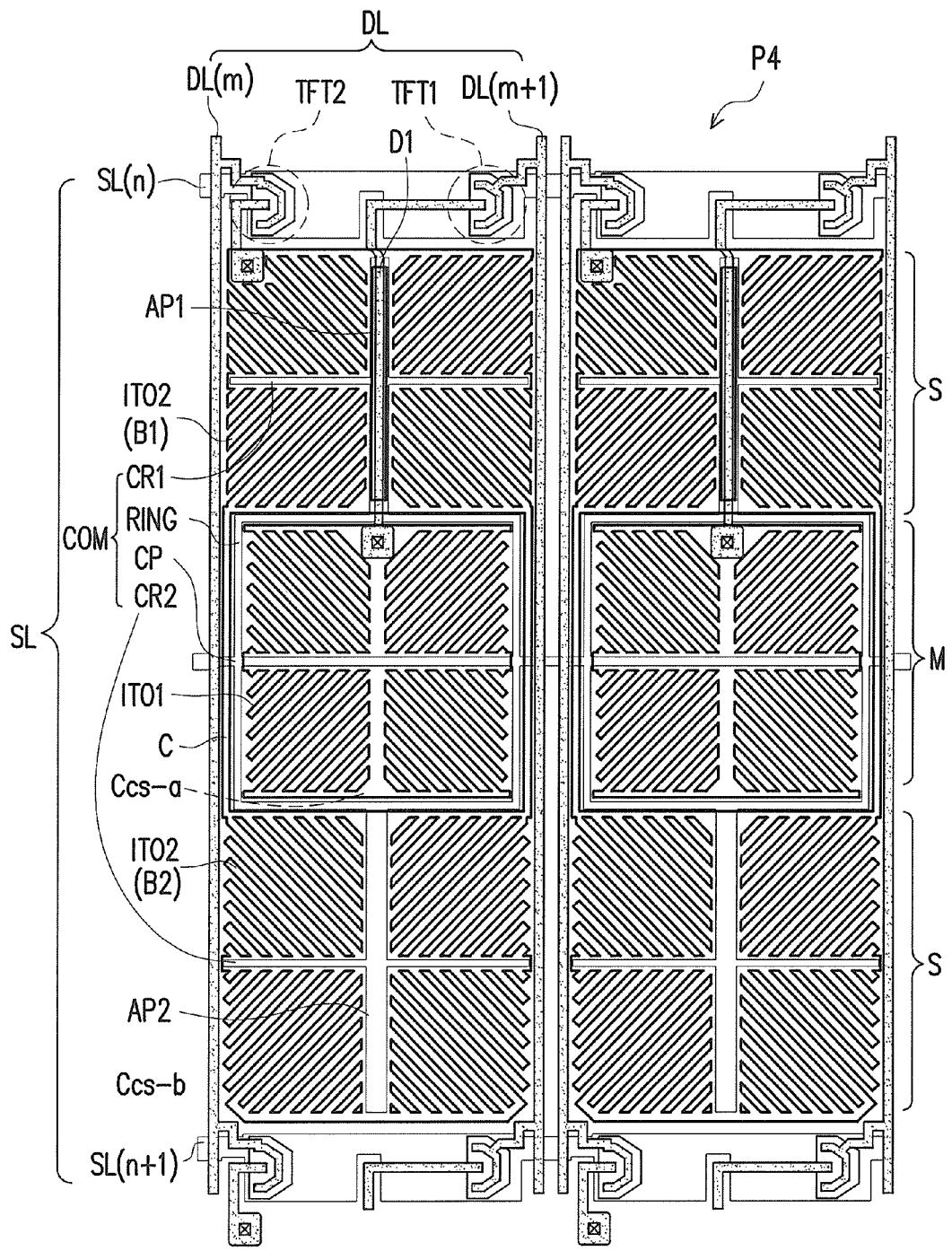
FIG. 5 schematically illustrates a pixel array according to the fourth embodiment of the present invention.

FIG. 5 schematically illustrates a pixel array according to the fifth embodiment of the present invention. Referring to FIG. 5, the pixel array 200c of this embodiment includes a plurality of scan lines SL (only scan lines SL(n) and SL(n+1) are schematically illustrated in FIG. 5), a plurality of data lines DL (only data lines DL(m) and DL(m+1) are schematically illustrated in FIG. 5), a plurality of sub-pixels P4 and a common line COM. In this embodiment, each sub-pixel P4 arranged in the $n^{th}$ row includes a first switch TFT1, a second switch TFT2, a first pixel electrode ITO1 and a second pixel electrode ITO2. The first switch TFT1 and the second switch TFT2 are electrically connected the $n^{th}$ scan line while electrically connected to different data lines (e.g. data line DL(m) and data line DL(m+1)). In other words, the sub-pixels P4 are designed as sub-pixels with 2D1G structure. The first switch TFT1 has a signal output terminal D1, and the first pixel electrode ITO1 is disposed in the main display region M and electrically connected to the signal output terminal D1 of the first switch TFT1. The second pixel electrode ITO2 is disposed in the sub-display region S and electrically connected to the second switch TFT2, and the first pixel electrode ITO1 is surrounded by the second pixel electrode ITO2 in each sub-pixel P4.

In this embodiment, each second pixel electrode ITO2 includes a first sub-electrode portion B1, a second sub-electrode portion B2 and at least one connection line C. The connection line C is connected to the first sub-electrode portion B1 and the second sub-electrode portion B2. In each sub-pixel P4, the first pixel electrode ITO1 is disposed between the first sub-electrode portion B1 and the second sub-electrode portion B2, and the first pixel electrode ITO1 is surrounded by the first sub-electrode portion B1, the second sub-electrode portion B2 and the connection line C. For example, the number of the connection lines C in each sub-pixel P4 is two, and the two connection lines C is respectively disposed beside the first pixel electrode ITO1. Further, the width of the two connection lines C can be adjusted according to the actual demand. In addition, the number of the connection lines C in each sub-pixel P4 can be one, and this connection line C is only disposed at one side of the first pixel electrode ITO1, so as to reduce the crosstalk phenomenon between the two adjacent first pixel electrodes ITO1.

Figure 6A:
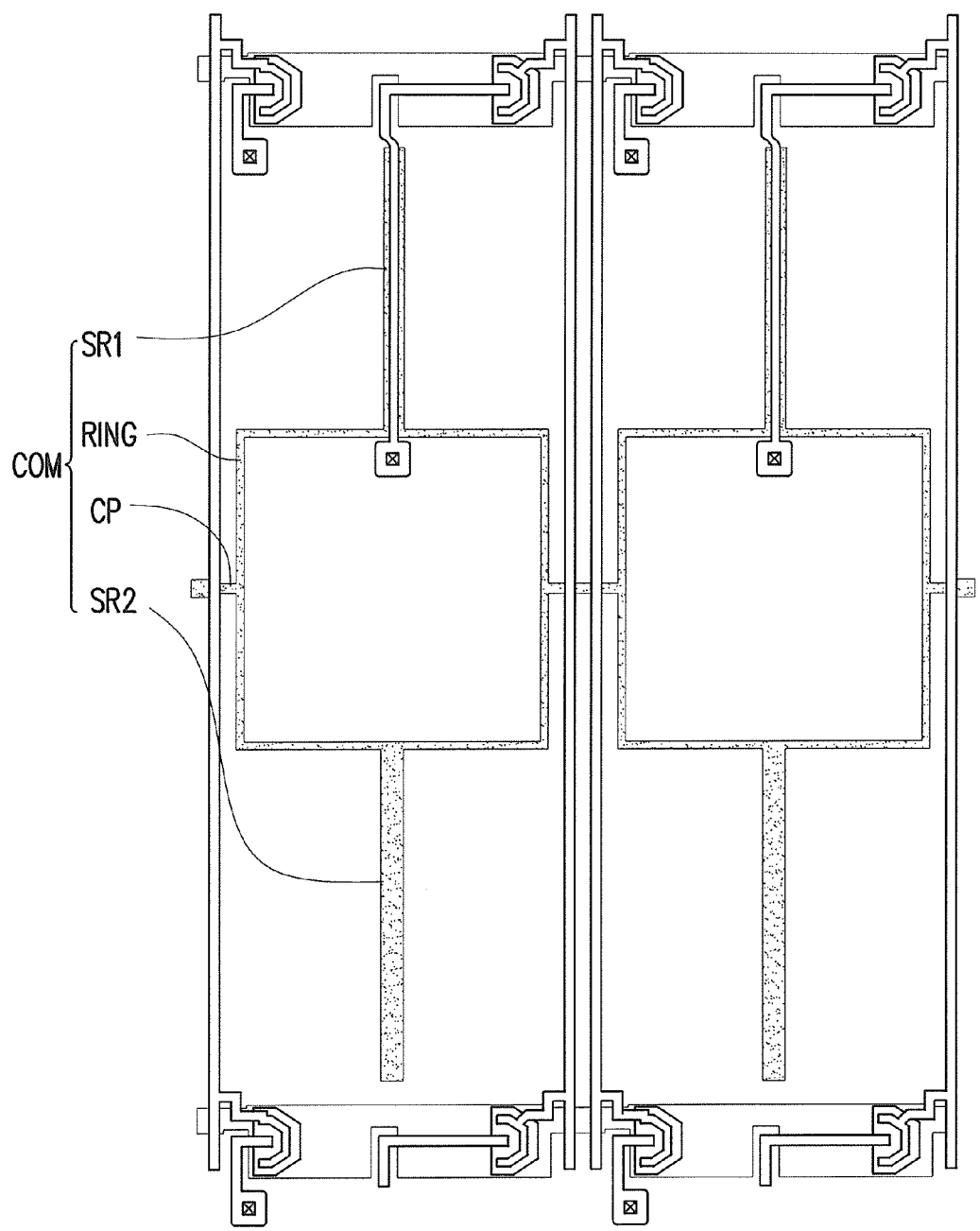
FIGS. 6A-6C schematically illustrate other designs of a common line.
Figure 6B:
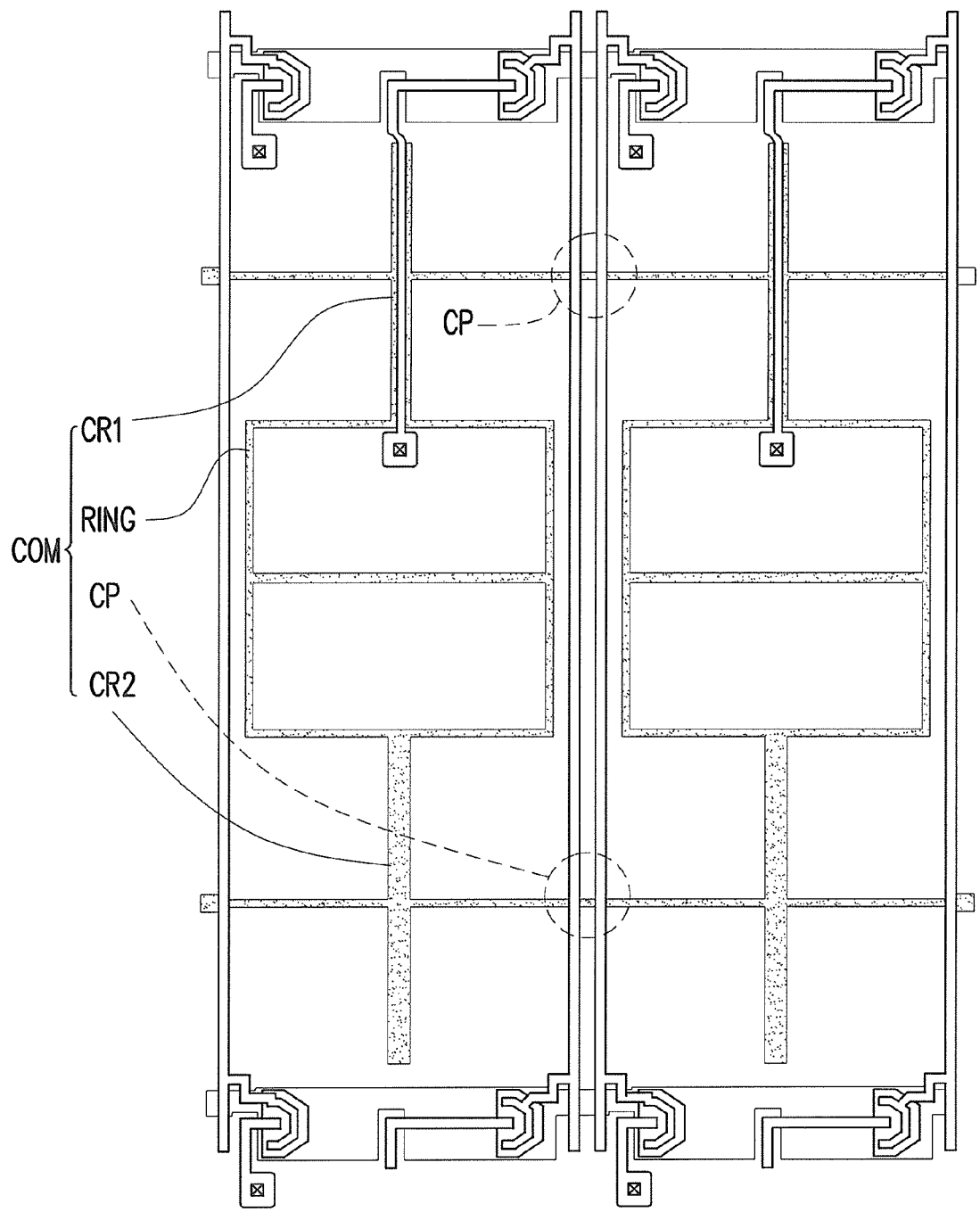
Figure 6C:
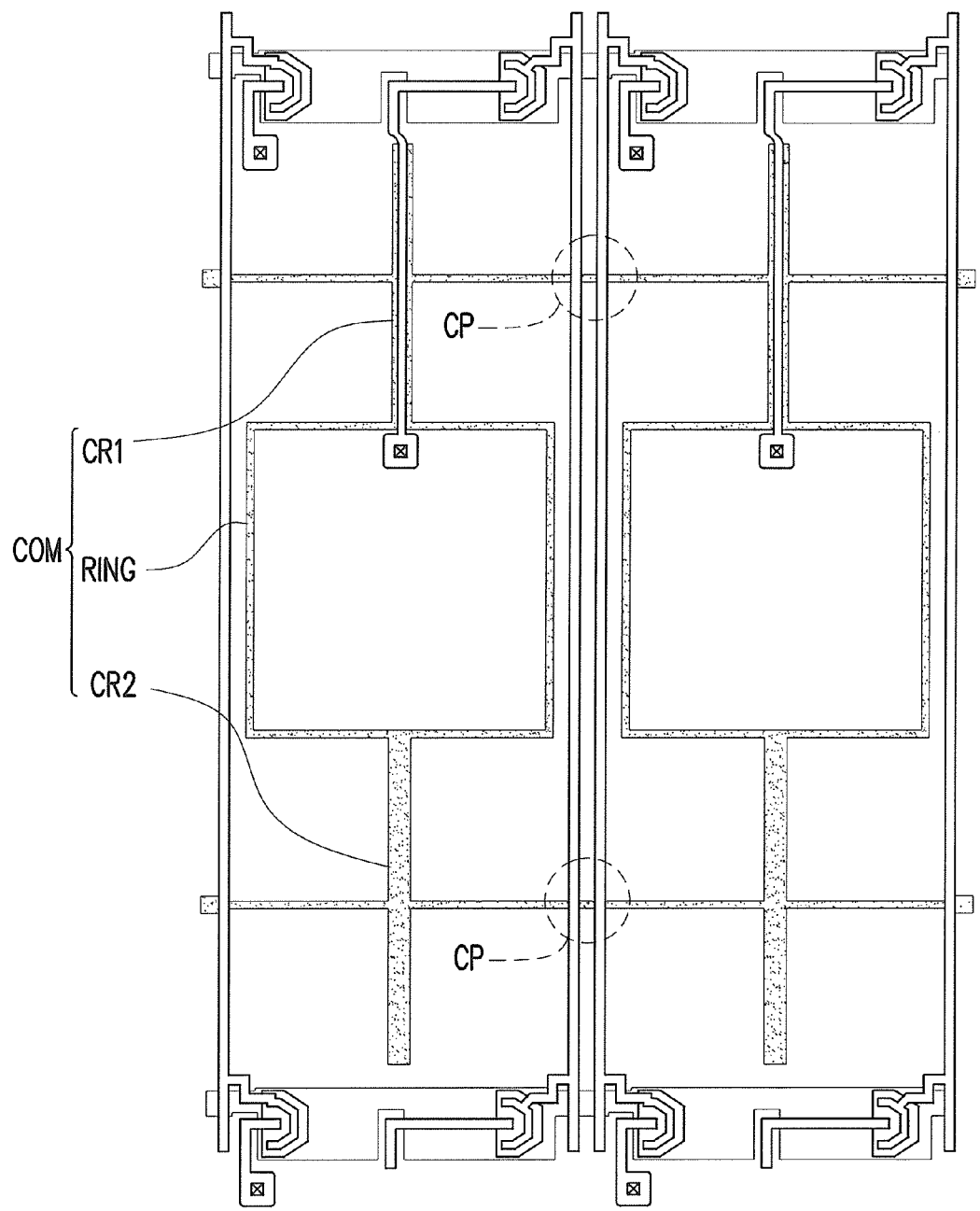

The designs of the common line COM in the sub-pixels P4 of this embodiment are similar to those in the sub-pixels P3 of the third embodiment. Herein, in this embodiment, FIGS. 6A-6C schematically illustrate other designs of a common line. In details, the designs of the common line COM in FIGS. 6A to 6C are substantially the same as those of the common line COM in FIGS. 4A-4C, and the difference lies in that the designs in FIGS. 6A-6C are applied to the sub-pixels P4 with 2D1G structure.

Fifth Embodiment

Figure 7:
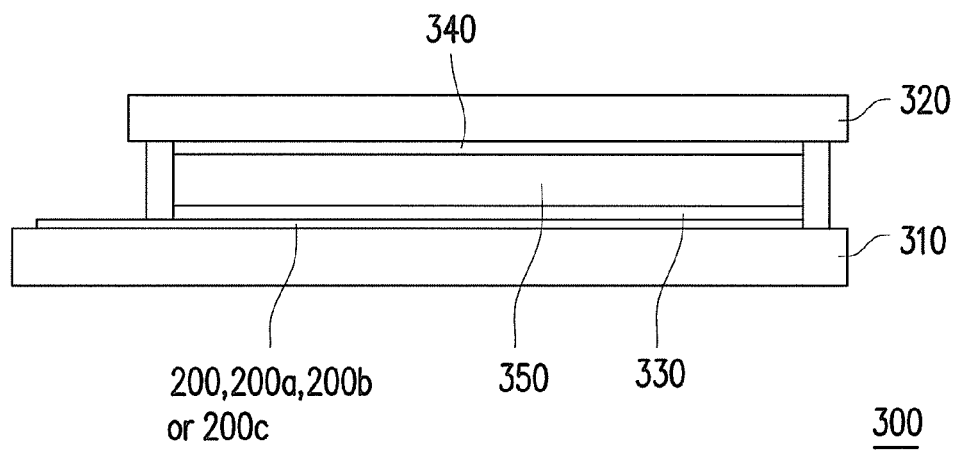
FIG. 7 schematically illustrates a polymer stabilized alignment liquid crystal display (PSA-LCD) panel of the present invention.

FIG. 7 schematically illustrates a polymer stabilized alignment liquid crystal display (PSA-LCD) panel of the present invention. Referring to FIG. 7, the PSF-LCD panel 300 of this embodiment includes a first substrate 310, a second substrate 320, two polymer stabilized alignment layers 330 and 340 and a liquid crystal layer 350. The first substrate 310 has the pixel array 200, 200a, 200b or 200c described in the above-mentioned embodiments. The second substrate 320 is disposed above the first substrate 310. The two polymer stabilized alignment layers 330 and 340 are respectively disposed on the first substrate 310 and the second substrate 320. Further, the liquid crystal layer 350 are disposed between the two polymer stabilized alignment layers 330 and 340. It is noted that the liquid crystal layer 350 is made of a liquid crystal material containing monomers which can be polymerized by an energy source. When the energy source (e.g. an ultraviolet ray) is supplied to the liquid crystal layer 350, the monomers are respectively polymerized on the surfaces of the first substrate 310 and the second substrate 320 to foiin the two polymer stabilized alignment layers 330 and 340.

Figure 8:
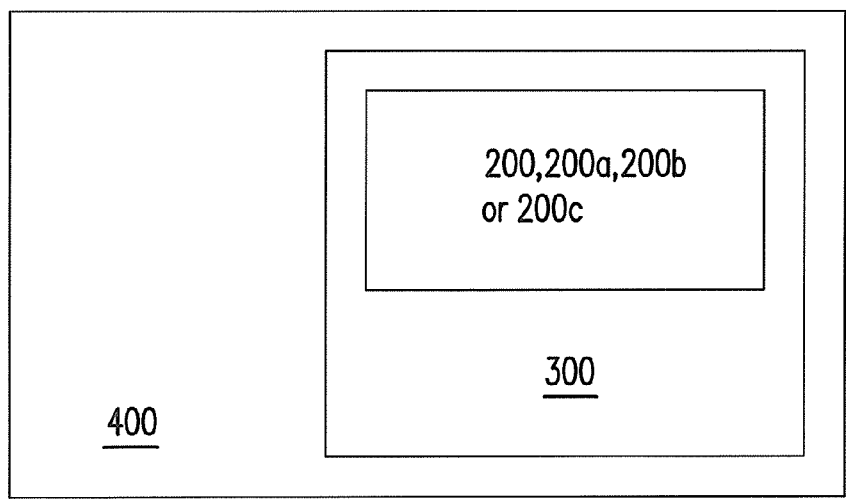
FIG. 8 schematically illustrates an optoelectronic device of the present invention.

FIG. 8 schematically illustrates an optoelectronic device of the present invention. Referring to FIG. 8, in the present embodiment, the optoelectronic device 700 includes the pixel array 200, 200a, 200b or 200c described in the above-mentioned embodiments or the PSA-LCD panel 300 illustrated in FIG. 7. The optoelectronic device may be a portable product (e.g. a cell phone, a video camera, a camera, a notebook computer, a game console, a watch, a music player, an email transceiver, a digital navigator, or a digital photo or the like), a video/audio product (e.g. a video/audio player or the like), a screen, a television set, a digital billboard, or a panel in a projector, etc.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A pixel array, comprising:
    a plurality of scan lines;
    a plurality of data lines intersected with the scan lines to define a plurality of sub-pixel regions; and
    a plurality of sub-pixels disposed in the sub-pixel regions, wherein each of the sub-pixels is electrically connected to one of the scan lines and one of the data lines correspondingly, and each of the sub-pixels arranged in the $n^{th}$ row comprises:
        a first switch;
        a second switch, wherein the first switch and the second switch are electrically connected the $n^{th}$ scan line and the $m^{th}$ data line, and the first switch has a signal output terminal;
        a first pixel electrode electrically connected to the first switch;
        a second pixel electrode electrically connected the second switch and having an opening for accommodating the first pixel electrode, wherein the first pixel electrode is surrounded by the second pixel electrode in each of the sub-pixels, and each second pixel electrode comprises:
            a first sub-electrode portion;
            a second sub-electrode portion; and
            at least one connection line connected to the first sub-electrode portion and the second sub-electrode portion, wherein in each of the sub-pixels, the first pixel electrode is disposed between the first sub-electrode portion and the second sub-electrode portion, and the first pixel electrode is surrounded by the first sub-electrode portion, the second sub-electrode portion and the connection line;
        a plurality of first common lines disposed under the first sub-electrode portions and the first pixel electrodes;
        a plurality of second common lines disposed under the second sub-electrode portions; and
        a third switch electrically connected to the $(n+1)^{th}$ scan line and the second pixel electrode and having a floating terminal.

2. The pixel array of claim 1, wherein each first switch arranged in the $n^{th}$ row is a first thin film transistor having a first gate electrically connected to the $n^{th}$ scan line, a first source electrically connected to one of the data lines, and the signal output terminal electrically to the first pixel electrode.

3. The pixel array of claim 1, wherein each second switch arranged in the $n^{th}$ row is a second thin film transistor having a second gate electrically connected to the n$^{th}$ scan line, a second source electrically connected to one of the data lines, and a second drain.

4. The pixel array of claim 1, wherein each third switch arranged in the n$^{th}$ row is a third thin film transistor having a third gate electrically connected to the (n+1)$^{th}$ scan line, a third source electrically connected to the second pixel electrode, and the floating terminal.

5. The pixel array of claim 1, wherein the floating terminal extends from the (n+1)$^{th}$ scan line to under the second sub-electrode portion and the first pixel electrode correspondingly.

6. The pixel array of claim 1, wherein a portion of the signal output terminal is disposed above one of the first common lines correspondingly.

7. The pixel array of claim 1, wherein at least a portion of the second common lines are disposed under the floating terminals.

8. The pixel array of claim 1, wherein each first sub-electrode portion has at least one first aperture disposed above the signal output terminal.

9. The pixel array of claim 1, wherein each second sub-electrode portion has at least one second aperture disposed above the floating terminal.

10. A pixel array, comprising:
a plurality of scan lines;
a plurality of data lines intersected with the scan lines to define a plurality of sub-pixel regions;
a plurality of sub-pixels disposed in the sub-pixel regions, wherein each of the sub-pixels is electrically connected to one of the scan lines and one of the data lines correspondingly, each of the sub-pixels arranged in the n$^{th}$ row comprises a main display region and a sub-display region, and the main display region is surrounded by the sub-display region; and
a common line disposed under the sub-display regions and surrounding the main display regions.

11. The pixel array of claim 10, wherein each of the sub-pixels arranged in the n$^{th}$ row comprises:
a first switch;
a second switch, wherein the first switch and the second switch are electrically connected the n$^{th}$ scan line and the m$^{th}$ data line, and the first switch has a signal output terminal;
a first pixel electrode disposed in the main display region and electrically connected to the signal output terminal of the first switch;
a second pixel electrode disposed in the sub-display region and electrically connected the second switch, wherein the first pixel electrode is surrounded by the second pixel electrode in each of the sub-pixels; and
a third switch electrically connected to the (n+1)$^{th}$ scan line and the second pixel electrode and having a floating terminal.

12. The pixel array of claim 11, wherein each first switch arranged in the n$^{th}$ row is a first thin film transistor having a first gate electrically connected to the n$^{th}$ scan line, a first source electrically connected to one of the data lines, and the signal output terminal electrically to the first pixel electrode.

13. The pixel array of claim 11, wherein each second switch arranged in the n$^{th}$ row is a second thin film transistor having a second gate electrically connected to the n$^{th}$ scan line, a second source electrically connected to one of the data lines, and a second drain.

14. The pixel array of claim 11, wherein each third switch arranged in the n$^{th}$ row is a third thin film transistor having a third gate electrically connected to the (n+1)$^{th}$ scan line, a third source electrically connected to the second pixel electrode, and the floating terminal.

15. The pixel array of claim 10, wherein each second pixel electrode comprises:
a first sub-electrode portion;
a second sub-electrode portion; and
at least one connection line, connected to the first sub-electrode portion and the second sub-electrode portion, wherein in each of the sub-pixels, the first pixel electrode is disposed between the first sub-electrode portion and the second sub-electrode portion, and the first pixel electrode is surrounded by the first sub-electrode portion, the second sub-electrode portion and the connection line.

16. The pixel array of claim 15, wherein the floating terminal extends from the (n+1)$^{th}$ scan line to under the second sub-electrode portion and the first pixel electrode correspondingly.

17. The pixel array of claim 15, wherein the common line comprises:
a plurality of ring patterns, respectively surrounding the main display regions;
a plurality of first cross patterns, respectively connected to the ring patterns, wherein each of the first cross patterns is disposed under one of the first sub-electrode portions correspondingly; and
a plurality of second cross patterns, respectively connected to the ring patterns, wherein each of the second cross patterns is disposed under one of the second sub-electrode portions correspondingly.

18. The pixel array of claim 17, wherein the ring patterns are connected to each other through a plurality of connection patterns.

19. The pixel array of claim 17, wherein the first cross patterns and the second cross patterns are connected to each other through a plurality of connection patterns.

20. The pixel array of claim 17, wherein a portion of the signal output terminal is disposed above one of the first cross patterns correspondingly.

21. The pixel array of claim 17, wherein the second cross patterns are respectively disposed under the floating terminals.

22. The pixel array of claim 15, wherein each first sub-electrode portion has at least one first aperture disposed above the signal output terminal.

23. The pixel array of claim 15, wherein each second sub-electrode portion has at least one second aperture disposed above the floating terminal.

24. The pixel array of claim 10, wherein each of the sub-pixels arranged in the n$^{th}$ row comprises:
a first switch;
a second switch, wherein the first switch and the second switch are electrically connected the n$^{th}$ scan line while electrically connected to different data lines, and the second switch has a signal output terminal;
a first pixel electrode disposed in the main display region and electrically connected to the first switch; and
a second pixel electrode disposed in the sub-display region and electrically connected the signal output terminal of the second switch, wherein the first pixel electrode is surrounded by the second pixel electrode in each of the sub-pixels.

25. The pixel array of claim 24, wherein each second pixel electrode comprises:
a first sub-electrode portion;
a second sub-electrode portion; and at least one connection line, connected to the first sub-electrode portion and the second sub-electrode portion, wherein in each of the sub-pixels, the first pixel electrode is disposed between the first sub-electrode portion and the second sub-electrode portion, and the first pixel electrode is surrounded by the first sub-electrode portion, the second sub-electrode portion and the connection line.

26. The pixel array of claim 25, wherein the common line comprises:
   a plurality of ring patterns, respectively surrounding the main display regions;
   a plurality of first cross patterns, respectively connected to the ring patterns, wherein each of the first cross patterns is disposed under one of the first sub-electrode portions correspondingly; and
   a plurality of second cross patterns, respectively connected to the ring patterns, wherein each of the second cross patterns is disposed under one of the second sub-electrode portions correspondingly.

27. The pixel array of claim 26, wherein the ring patterns are connected to each other through a plurality of connection patterns.

28. The pixel array of claim 26, wherein the first cross patterns and the second cross patterns are connected to each other through a plurality of connection patterns.

29. The pixel array of claim 26, wherein a portion of the signal output terminal is disposed above one of the first cross patterns correspondingly.

30. The pixel array of claim 25, wherein each first sub-electrode portion has at least one first aperture disposed above the signal output terminal.

31. A polymer stabilized alignment liquid crystal display (PAS-LCD) panel, comprising:
   a first substrate having the pixel array of claim 1;
   a second substrate disposed above the first substrate;
   two polymer stabilized alignment layers, respectively disposed on the first substrate and the second substrate; and
   a liquid crystal layer disposed between the polymer stabilized alignment layers;
   wherein the first pixel electrode has a plurality of first stripe electrode patterns extending in different directions, and the second pixel electrode has a plurality of second stripe electrode patterns extending in different directions.

32. A polymer stabilized alignment liquid crystal display (PAS-LCD) panel, comprising:
   a first substrate having the pixel array of claim 10;
   a second substrate disposed above the first substrate;
   two polymer stabilized alignment layers, respectively disposed on the first substrate and the second substrate; and
   a liquid crystal layer disposed between the polymer stabilized alignment layers;
   wherein the first pixel electrode has a plurality of first stripe electrode patterns extending in different directions, and the second pixel electrode has a plurality of second stripe electrode patterns extending in different directions.

* * * * *